United States Patent [19]

Friedman et al.

[11] Patent Number: 4,726,905

[45] Date of Patent: Feb. 23, 1988

[54] METHOD FOR REMOVING POLYCHLORINATED BIPHENYL COMPOUNDS FROM WATER

[75] Inventors: Robert B. Friedman, Chicago; Isaac R. West, South Holland, both of Ill.

[73] Assignee: American Maize-Products Company, Stamford, Conn.

[21] Appl. No.: 858,067

[22] Filed: Apr. 30, 1986

[51] Int. Cl.[4] .............................. C02F 1/28; B08B 7/00
[52] U.S. Cl. ........................................ 210/692; 134/7; 210/909
[58] Field of Search .................... 210/692, 909, 690; 134/6, 7

[56] References Cited

U.S. PATENT DOCUMENTS

| | | | |
|---|---|---|---|
| 3,472,835 | 10/1969 | Buckler et al. | 260/209 |
| 4,274,985 | 6/1981 | Szejtli et al. | 260/17.4 ST |
| 4,276,179 | 6/1981 | Soehngen | 210/692 |
| 4,357,468 | 11/1982 | Szejtli et al. | 536/56 |

OTHER PUBLICATIONS

Die Starke Nr. 5/1969—Properties of Cyclodextrins—Part III—N. Wiedenhof—pp. 119-123.
Die Starke Nr. 6/1969—Properties of Cyclodextrins—Part IV—N. Wiedenhof—pp. 163-166.
Die Starke Nr. 4/1971—Properties of Cyclodextrins—Part V—N. Wiedenhof—pp. 129-132.
M. G. Pepe—Adhesion-Binding of 2,2',4,4',5,5'-Hexachlorobiphenyl to Glass and Plastic: A Possible Source of Error for PCB Analysis—Bull. Environm. Contam. Toxicol. 25, 936-940, (1980).
J. Lawrence—Adsorption of Polychlorinated Biphenyls from Aqueous Solutions and Sewage—Environmental Science & Technology—vol. 10, No. 4, Apr. 1976—pp. 381-383.
D. J. Wildish—Flux of Aroclor 1254 Between Estuarine Sediments and Water, Bull. Environm. Contam. Toxicol. 24, 20-26, (1980).
Fisheries Research Board of Canada—Manuscript Report Series No. 1083—Polychlorinated Biphenyls: Determination by Optical Methods, Solubility and Solubilization in Water, Preliminary Results on Toxicity to Salmon—V. Zitko—Mar. 1970.

Primary Examiner—Ivars Cintins
Attorney, Agent, or Firm—Lucas & Just

[57] ABSTRACT

A method for removing polychlorinated biphenyl compounds from water is disclosed. The method encompasses the use of a cyclodextrin polymer made by forming a water-insoluble cross-linked cyclodextrin polymer to treat water contaminated with the polychlorinated biphenyl compounds. Both a batch and a continuous method are disclosed. Both methods operate at ambient conditions. Additionally, a method to absorb the polychlorinated biphenyl is disclosed.

11 Claims, 1 Drawing Figure

FIG. I.
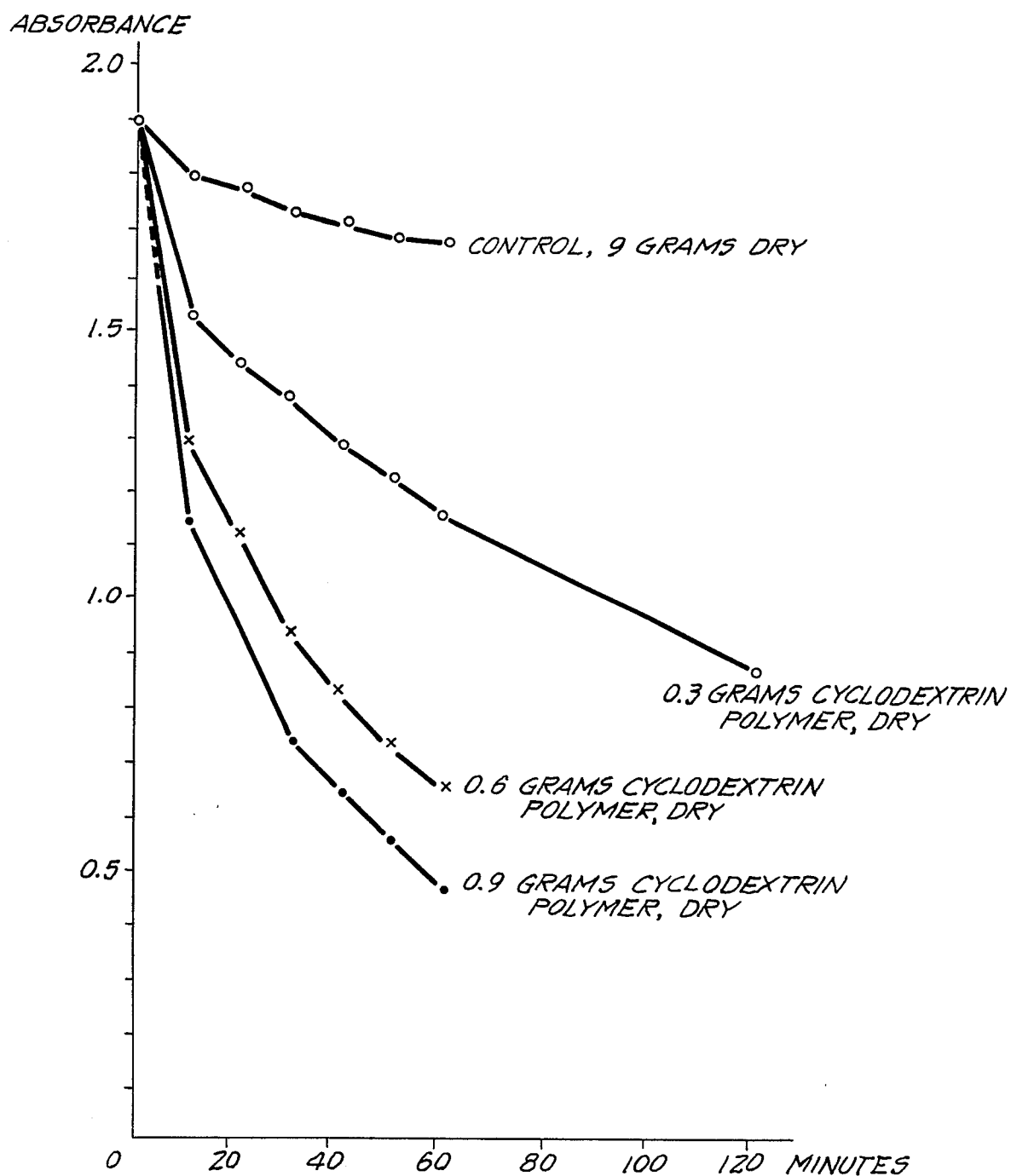

METHOD FOR REMOVING POLYCHLORINATED BIPHENYL COMPOUNDS FROM WATER

This invention relates to waste treatment and more particularly to the removal of polychlorinated biphenyls from water.

Polychlorinated biphenyls, also known as PCBs, are a group of chlorinated polyaromatic compounds that became widely used in numerous commercial applications starting in the early 1930s because of their unique thermal stability and non-reactive nature. It has recently been discovered that PCBs are also highly toxic. Because of this toxicity, manufacture and use of PCBs has been greatly curtailed and their use has generally been limited to closed systems. However, because of their thermal and chemical stability and non-reactive nature, PCBs exist in significant amounts in the environment and have found their way into all levels of the food chain. There is a need for an efficient and economic method for removing PCBs and other polyaromatic compounds from the environment.

The use of polyvinyl chloride, polyurethane foams and polystyrene resins has been suggested. However, the efficiency of such polymers is poor.

A method has now been discovered for efficiently and economically removing PCBs from water. More particularly, it has been discovered that by forming a polymer from cyclodextrins and then contacting contaminated water with the polymer of cyclodextrins, the PCB contaminate is removed from the water.

Cyclodextrin polymers are disclosed in U.S. Pat. Nos. 3,472,835; 4,274,985; and 4,357,468. The '835 patent teaches a cyclodextrin polymer as a filter from a vapor phase. The '985 patent discloses a cyclodextrin-polyvinyl alcohol polymer for use as a filter for nicotine (1-methyl-2-(3-pyridyl) pyrrolidine) from cigarette smoke and for benzene in water. The '468 patent uses a cyclodextrin-cellulose polymer for use as a filter for benzene, phenol, cresol in aqueous solutions, and tar and nicotine from cigarette smoke. These patents relate to removing simple, single aromatic compounds.

It is truly surprising and unexpected that complex polyaromatic compounds like PCBs are removed with the use of a cyclodextrin polymer. Generally, cyclodextrins form inclusion complexes with simple aromatic compounds, however, the formation of an inclusion complex with complex polyaromatic compounds like PCBs is surprising and unexpected. The formation of the inclusion complex between PCBs and cyclodextrin is truly unexpected and surprising because PCBs are physically larger molecules than simple aromatic compounds like benzene. Additionally, chlorine atoms protrude from the PCBs making the physical appearance of the PCB extremely different from the simple benzene. Also, the physical nature of PCBs is an extended planar molecule which is very different from the simple benzene structure. All of these properties of PCBs lead one of skill in the art to presume that PCBs cannot be removed from water with a cyclodextrin polymer. Thus, it was truly surprising and unexpected that PCBs are removed efficiently from water with the use of a cyclodextrin polymer.

Cyclodextrins also called "Schardinger Dextrins" are cyclic oligosaccharides composed of glucose units bonded together by alpha 1,4 bonds. The six membered ring structure is called alpha-cyclodextrin, the seven membered ring is beta-cyclodextrin and the eight membered ring is gamma-cyclodextrin. The cyclodextrins have different chemical and physical properties from the linear ologosaccharides derived from starch in that they are non-reducing dextrins.

As is also well-known, cyclodextrins are produced from starch of any selected plant variety such as corn, potato, waxy maize and the like which may be modified or unmodified starch derived from cereal or tuber origin and the amylose or amylopectin fractions thereof. The selected starch in aqueous slurry at selected concentration up to about 35% by weight solids is usually liquefied as by gelatinization or treatment with a liquefying enzyme such as bacterial alpha-amylase enzyme and then subject to treatment with a transglycosylase (CGT) enzyme to form the cyclodextrins.

The amount of the individual alpha, beta and gamma-cyclodextrins produced by treating the starch with the CGT enzyme will vary depending on the selected starch, selected CGT enzyme and processing conditions. The parameters to select for the CGT enzyme conversion for the desired result in the amount of each individual cyclodextrin to be produced is conventional and well-described in the literature.

Conventionally, the DE of the liquefied starch is maintained below about 20 DE, the starch solids concentration is below about 35% by weight, the pH for conversion may be about 4.5 to 8.5 at a selected temperature from ambient and up to about 75° C. for a selected period of time typically from about 10 hours up to seven days and more. The amount of CGT enzyme used for conversion is conventional and well-known in the art.

Separation and purification of the cyclodextrin thus obtained is conventional and well-known to those of skill in the art.

The preferred cyclodextrin for use in the present invention is beta-cyclodextrin because of its relative availability and relative low cost, but any cyclodextrin or mixture of cyclodextrins can be used to form the polymer.

Formation of the cyclodextrin polymer is carried out in a conventional manner. Suitable means include reacting the cyclodextrin with a cross-linking agent to form a cyclodextrin polymer. A suitable means for performing such a reaction to form beads of the cyclodextrin polymer is disclosed in an article written by Wiedenhof et al. in Vol. 21 at page 119 of Die Starke 1969. Typically, a dry cyclodextrin is wetted with water and then dissolved in a basic solution, typically 30% sodium hydroxide. To this is added sodium borohydride to prevent the cyclodextrin from oxidizing. This aqueous solution is added to a solvent such as methyl isobutyl ketone containing a surfactant such as polyethoxylated octyl phenyl ether. The mixture is then stirred to form an emulsion of cyclodextrin solution in the solvent. The cyclodextrin is the disperse phase and generally in small particle-like cells. To this emulsion, a cross-linking agent is added in an amount sufficient to allow the cyclodextrin to form a cross-linked outer surface and preferably enough to allow the cyclodextrin to become a cross-linked bead. Typically, about 34% molar excess of cross-linking agent is added based on the moles of cyclodextrin in the emulsion i.e. 34 moles of cross-linking agent per one mole of cyclodextrin. In this manner water-insoluble beads of cross-linked cyclodextrins are formed. Suitable cross-linking agents include epichlorohydrin, trimetaphosphate, phosphorous oxychloride and butandiol diglycidyl ether. Preferably etherifying cross-linking agents are used such as epihalohydrins like epichlorohydrin and epibromohydrin or di epoxide compounds. Also, preferably beads are made and preferably the beads are about 20 to about 60 mesh in size. A good commercial bead has a bulk density of about 0.68 gms/cc, a dry volume of about 1.49 cm/gm, a hydrated volume of about 5.1 mls/gm, and a water absorption of about 3.5 gms water/gm cyclodextrin polyer.

Other conventional means of forming a polymer with cyclodextrins are possible, however, commercially for such purpose the formation of water-insoluble beads as described above is preferred.

Another method of forming a cyclodextrin polymer is to use already formed polymers as a backbone and onto that backbone attach cyclodextrins. The backbone and attached cyclodextrins may be insoluble in water just as the cross-linked beads of cyclodextrins are. Suitable backbones are polyurethane, cellulose, polyvinyl alcohol and polystyrene derivatives. In such instances, the cyclodextrin is preferably covalently bonded to the backbone. The method for forming a cyclodextrin polymer on a backbone of another, already formed polymer is conventional and accomplished in a conventional manner.

It is also possible that the cyclodextrin polymer is formed as a membrane through which the contaminated water passes. This is accomplished in a conventional manner.

It is important that the cyclodextrin polymer be insoluble so that as the contaminated water is contacted with the cyclodextrin polymer, the water does not dissolve the cyclodextrin polymer.

Contacting the contaminated water with the cyclodextrin polymer is accomplished commercially by means of a column packed with water insoluble cyclodextrin polymer beads. Assembling and running the column is accomplished in a conventional manner. Typically, a standard column is packed in a conventional manner with swollen cyclodextrin polymer beads. Swelling the cyclodextrin bead is accomplished by wetting the bead with a sufficient amount of water to cause the bead to swell in size. Then the contaminated water is moved through the column in a conventional manner such as by pumping or pouring. The effluent is monitored in a conventional manner such as spectroscopically or chromatographically to determine when the column becomes saturated with the contaminate. When the column reaches the point where the effluent has an unacceptable level of contaminate, a new column packed with water-insoluble cyclodextrin beads is substituted for the saturated column and the saturated column is regenerated or the spent cyclodextrin beads are disposed of, such as by incineration or by burial in a safe landfill.

The temperature at which the column is operated is ambient, however, heating the column in a conventional manner such as by hot water or electrical jacket, increases the efficiency of the column. The size and flow rate through the column are conventional.

Another method for contacting the contaminated water with the cyclodextrin polymer is to add the cyclodextrin polymer, preferably in the form of water-insoluble beads, to the contaminated water and stir the water and beads for a sufficient amount of time to allow the cyclodextrin to remove the contaminate from the water. This batch-wise process is carried out at ambient temperature and pressure.

The contaminated water can be either salt or fresh and may contain other additives or contaminates besides the PCB compounds. The salt in the water does not effect the efficiency of the cyclodextrin polymer in any appreciable manner. The batch method can also be used even in the absence of water as is the case in a spill such as where the PCBs have been spilled from a closed system onto the floor. The cyclodextrin polymer is applied to the spill and used to absorb the contaminate. The used cyclodextrin polymer is then disposed of or regenerated as was the case with the continuous column operation. It is truly surprising and unexpected that the cyclodextrin polymer is used is such a manner.

The exact chemistry of the present invention is not precisely known. It is believed that the inclusion capability of the cyclodextrin causes the PCB compounds to be encapsulated in the cyclodextrin and thereby removed from solution. It is truly surprising and unexpected that PCBs form inclusion complexes with the cyclodextrin polymer.

FIG. 1 shows removal of PCBs according to the invention.

Further details of the present invention will be understood by reference to the following examples which illustrate several embodiments of the present invention.

EXAMPLE 1

This example illustrates the use of a batch method to treat contaminated water with a water-insoluble cyclodextrin polymer bead to remove PCBs from water.

A dry beta-cyclodextrin which was made in a conventional manner, was cross-linked with epichlorohydrin to form beads of water-insoluble cyclodextrin polymer. In order to form the beads, 100 grams of dry beta-cyclodextrin was wetted by adding 100 ml of water to the cyclodextrin. The wetted cyclodextrin was then added to 160 grams of 30% NaOH. To this was added a small amount, 200 milligrams, of sodium borohydride to prevent the cyclodextrin from oxidizing. This mixture was added to 3.5 liters of methyl isobutyl ketone as a reaction medium along with 20 mls of polyethoxylated octyl phenyl ether, a well-known surfactant. The mixture was then stirred and an emulsion formed. The cyclodextrins were in the disperse phase of the emulsion. This mixture was then equilibrated by stirring vigorously for five minutes.

After equilibration, the emulsion, a molar ratio of 34 parts of epichlorohydrin per one part of cyclodextrin, was added and the cyclodextrin was cross-linked to form a water-insoluble cyclodextrin-containing polymer bead. The beads were recovered by filtering the reaction mass.

In order to test the decontamination capability of the bead so formed, four containers were prepared, each containing a 50 ml aqueous solution of PCB (Aroclor 1254) containing 15 PPM of PCBs. As is known, the solubility of PCBs in water is low. Thus, to get a concentration of 15 PPM of PCBs, a surfactant, polyethoxylated trimethyl nonyl alcohol, was used to allow more PCB to be in solution. To this 50 ml solution varying amounts of water-insoluble cyclodextrin beads were added. The beads were originally dry, however, a sufficient amount of water was added to the beads so that they were in a swollen state prior to their addition to the contaminated water. The swollen cyclodextrin beads were then added in varying amounts to three of the four containers. To the fourth container a control polymer of polyepichlorohydrin obtained from Scientific Polymer Products, Inc. was added. The amount of dry polymer added to each container and the amount of PCBs removed from the water is shown in FIG. 1.

After the beads were added to the solution of PCBs, a magnetic stirrer was used to thoroughly mix the solution. Samples of liquid were removed for measuring the absorbance at the time intervals shown in FIG. 1. Absorbance was measured with a UV-visable spectrophotometer and measurements were made at about 214 nm wavelength following standard procedures as outlined in the manual provided with the apparatus. The solution was maintained at ambient temperature and pressure.

It is readily apparent that the cyclodextrin polymer produces superior results to the control polymer. It is clear from FIG. 1 that after a one hour treatment with 0.9 grams of cyclodextrin polymer, 75% of the PCBs were removed from solution.

EXAMPLE 2

A cyclodextrin polymer bead made in accordance with Example 1 above was used to pack a column. The column had an ID of 1 cm and a height of 5 cm. The column was run at ambient temperature and pressure. Contaminated water as described in Example 1 was prepared and pumped through the packed column at a flow rate of 2 ml/min. using gravity pressure. The effluent from the column was monitored with a gas chromatograph to determine the PCB concentration of the effluent. The effluent had less than 1 PPB, PCB. This is a continuous process.

EXAMPLE 3

This example illustrates the use of the cyclodextrin polymer to clean-up a spill of PCBs from a close system such as the ones used in transformers.

From a closed system of an electric transformer, PCBs leak onto a concrete floor of a facility. A sufficient amount of cyclodextrin polymer made in accordance with Example 1 above is placed onto the spill and agitated with a scrapper. Once all the liquid PCBs are absorbed by the cyclodextrin polymer, the polymer is gathered and disposed of by burial in a proper landfill.

In this manner a spill of PCB is cleaned up.

It will be understood that it is intended to cover all changes and modifications of the preferred embodiments herein chosen for the purpose of illustration which do not constitute a departure from the spirit and scope of the invention.

What is claimed is:

1. A method for removing polychlorinated biphenyl compounds from water comprising contacting water containing polychlorinated biphenyl compounds with a cyclodextrin polymer to remove the polychlorinated biphenyl compounds from the water.

2. The method of claim 1 wherein the cyclodextrin is beta-cyclodextrin.

3. The method of claim 1 wherein the cyclodextrin is alpha-cyclodextrin.

4. The method of claim 1 wherein the cyclodextrin is gamma-cyclodextrin.

5. The method of claim 1 wherein the cyclodextrin polymer is made by cross-linking beta-cyclodextrin to form a water-insoluble bead of cyclodextrin.

6. The method of claim 5 wherein epichlorohydrin is the cross-linking agent.

7. The method of claim 1 wherein the contacting is accomplished by adding beads of cyclodextrin polymer to the contaminated water and then agitating the bead in the water.

8. The method of claim 7 wherein the cyclodextrin is beta-cyclodextrin.

9. The method of claim 1 wherein the contacting step is accomplished by moving water through a column packed with the cyclodextrin polymer.

10. The method of claim 9 wherein the cyclodextrin is beta-cyclodextrin.

11. A method for absorbing polychlorinated biphenyl compounds comprising applying cyclodextrin polymer to the polychlorinated biphenyl compound thereby absorbing the polychlorinated biphenyl compound.

* * * * *